(12) United States Patent
Payen

(10) Patent No.: US 7,780,116 B2
(45) Date of Patent: Aug. 24, 2010

(54) COMPOSITE ANTI-CRASH STRUCTURE WITH CONTROLLED BUCKLING FOR AN AIRCRAFT

(75) Inventor: Hervé Payen, Velaux (FR)

(73) Assignee: Eurocopter, Marignane (FR)

( * ) Notice: Subject to any disclaimer, the term of this patent is extended or adjusted under 35 U.S.C. 154(b) by 136 days.

(21) Appl. No.: 11/698,020

(22) Filed: Jan. 26, 2007

(65) Prior Publication Data

US 2008/0023582 A1 Jan. 31, 2008

(30) Foreign Application Priority Data

Jan. 27, 2006 (FR) ................................. 06 00771

(51) Int. Cl.
*B64C 1/00* (2006.01)
(52) U.S. Cl. .................... 244/119; 244/120; 244/123.12
(58) Field of Classification Search ................ 244/17.1, 244/117 R, 119, 120, 123.12
See application file for complete search history.

(56) References Cited

U.S. PATENT DOCUMENTS

| | | | | |
|---|---|---|---|---|
| 1,311,205 | A | * | 7/1919 | Belcher .................. 244/123.12 |
| 1,469,220 | A | * | 10/1923 | Kemp ........................... 244/87 |
| 1,751,957 | A | * | 3/1930 | Towle ................... 244/123.12 |
| 1,808,842 | A | * | 6/1931 | Fedor .................... 244/123.12 |
| 2,986,300 | A | * | 5/1961 | Parrish ...................... 220/4.24 |
| 3,309,042 | A | * | 3/1967 | Edwards ..................... 244/209 |
| 4,084,029 | A | * | 4/1978 | Johnson et al. ............. 428/119 |
| 4,221,413 | A | * | 9/1980 | Bonnetain ................... 293/122 |
| 4,593,870 | A | * | 6/1986 | Cronkhite et al. ....... 244/117 R |
| 4,734,146 | A | * | 3/1988 | Halcomb et al. ............ 156/148 |
| 4,890,752 | A | * | 1/1990 | Ota et al. ..................... 215/384 |
| 4,941,767 | A | | 7/1990 | Kidd |
| 5,069,318 | A | * | 12/1991 | Kulesha et al. .............. 188/377 |
| 5,451,015 | A | * | 9/1995 | Cronkhite et al. ....... 244/135 R |
| 5,542,626 | A | * | 8/1996 | Beuck et al. ................ 244/107 |
| 6,019,316 | A | | 2/2000 | Sarlin et al. |
| 6,427,945 | B1 | * | 8/2002 | Bansemir ................. 244/129.1 |

(Continued)

FOREIGN PATENT DOCUMENTS

FR 2 632 604 12/1989
WO WO 03/018295 3/2003

OTHER PUBLICATIONS

Carden H D et al., "Energy-Absorbing-Beam Design for Composite Aircraft Subfloors" AIAA/ASME/ASCE/AHS Structures, Structural Dynamics and Materials Conference, AIAA, Washington, D.C., Apr. 19, 1993, pp. 378-388.

(Continued)

*Primary Examiner*—Timothy D Collins
*Assistant Examiner*—Philip J Bonzell
(74) *Attorney, Agent, or Firm*—Young & Thompson

(57) ABSTRACT

A structure (2) for an aircraft (1) comprises transverse walls (3-8) connected to longitudinal walls (9-12); each wall (3-12, 18, 18B) comprises two jackets (19) of composite material disposed on either side of an intermediate arrangement (20); a wall includes a corrugated core (70) presenting corrugations extending along an axis (Z) substantially parallel to the jacket, such that the capacity of the wall to absorb energy in the event of an impact along said axis is increased; a wall includes a zone of weakness (45) encouraging controlled degradation of the wall in the event of such a shock.

22 Claims, 6 Drawing Sheets

U.S. PATENT DOCUMENTS

| | | | |
|---|---|---|---|
| 6,620,484 B1 * | 9/2003 | Bolukbasi et al. | 428/102 |
| 6,718,713 B2 | 4/2004 | McKague et al. | |
| 6,766,985 B2 * | 7/2004 | Dussac et al. | 244/119 |
| 6,948,684 B2 * | 9/2005 | Beral et al. | 244/119 |
| 6,959,894 B2 * | 11/2005 | Hayashi | 244/17.11 |
| 7,325,771 B2 * | 2/2008 | Stulc et al. | 244/119 |

OTHER PUBLICATIONS

Lestari W et al., "Development of a Trigger Mechanism to Reduce Peak Forces in Crash Loaded Composite Sine-Wave Spars" European Rotorcraft Forum, Amsterdam, NL, Oct. 4, 1994, pp. 107-01-107-15.

* cited by examiner

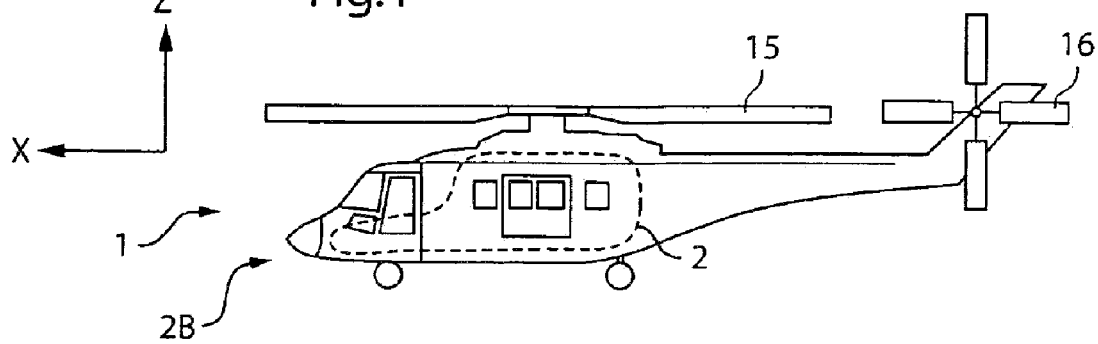
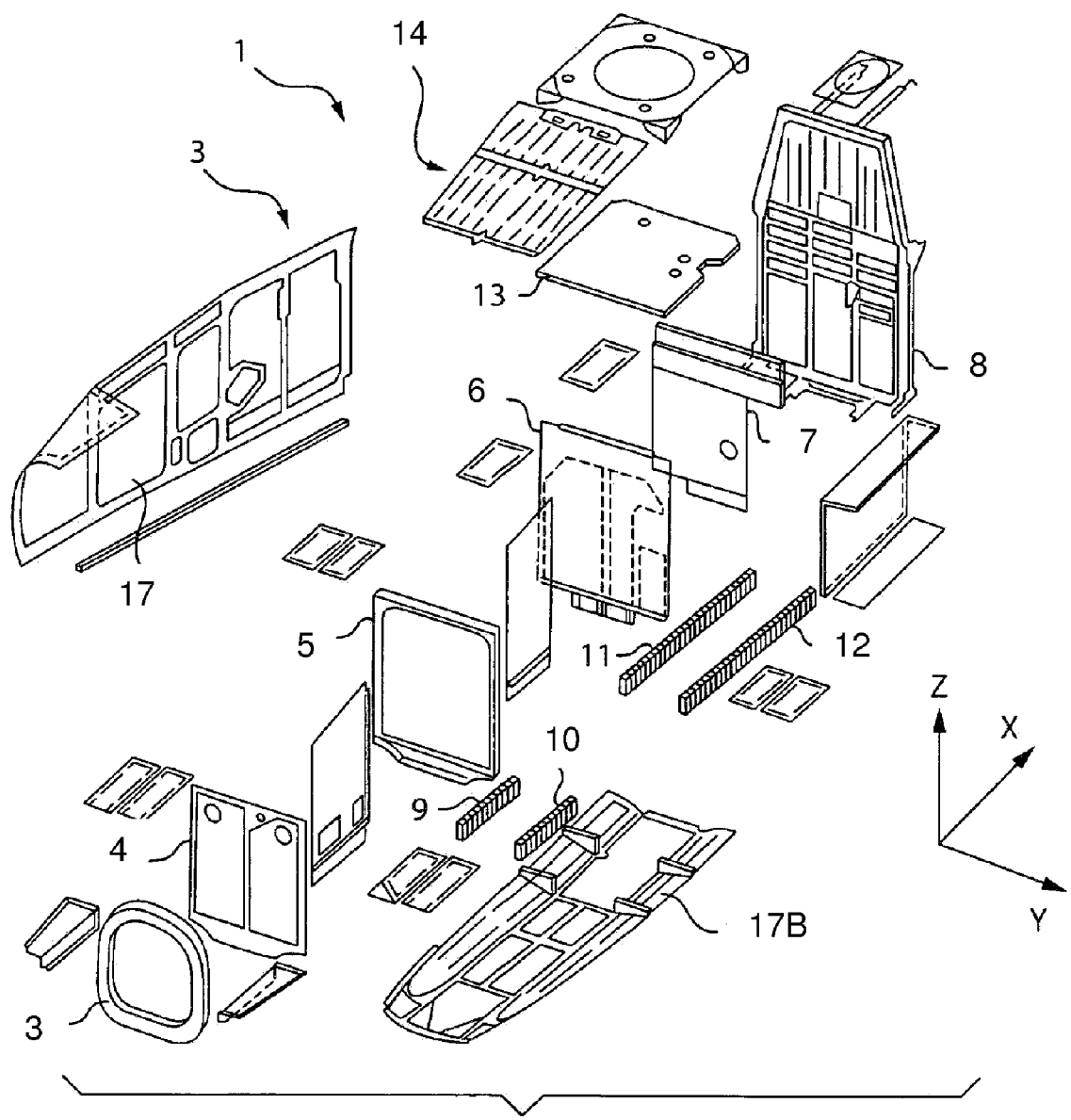

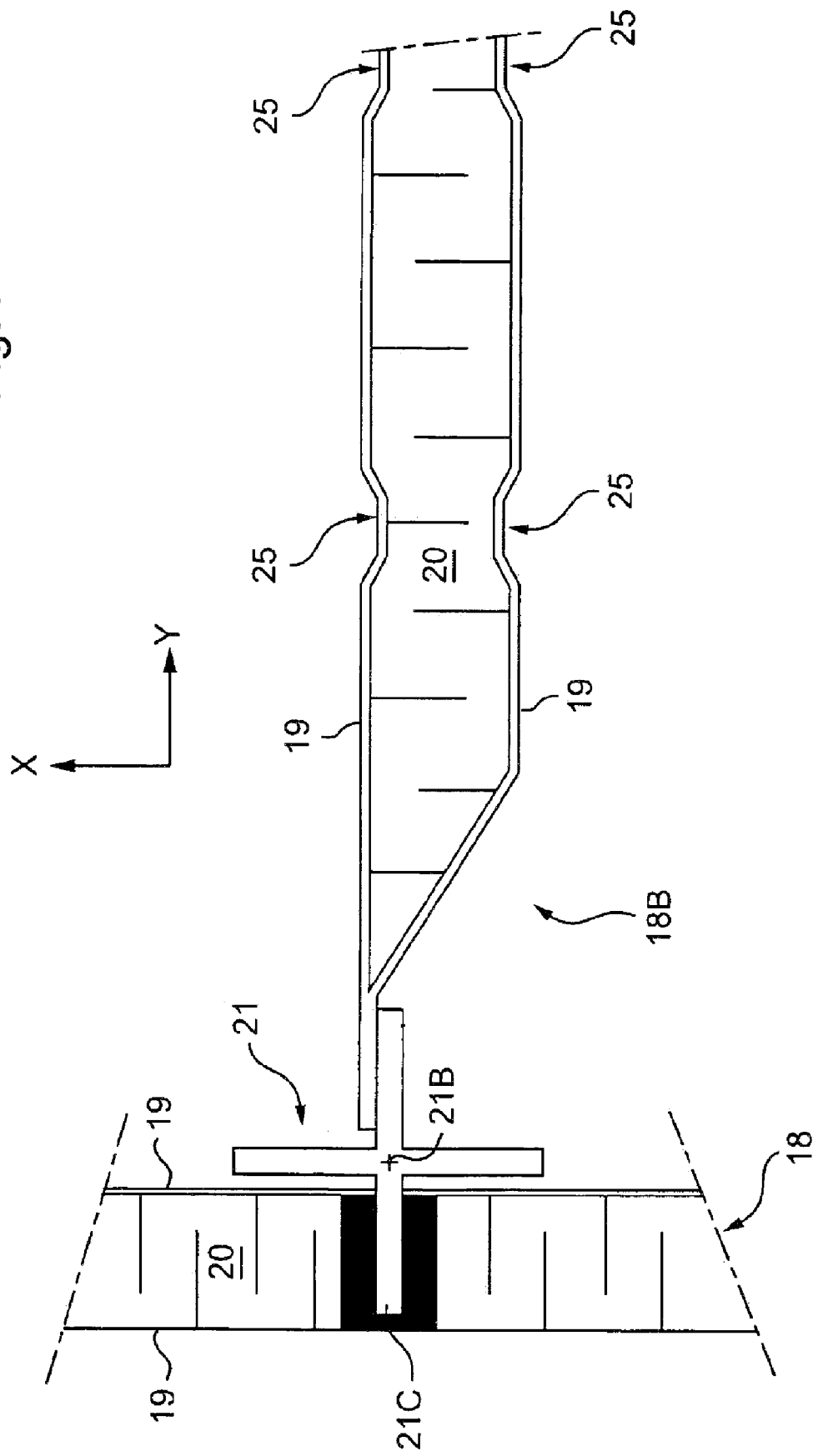

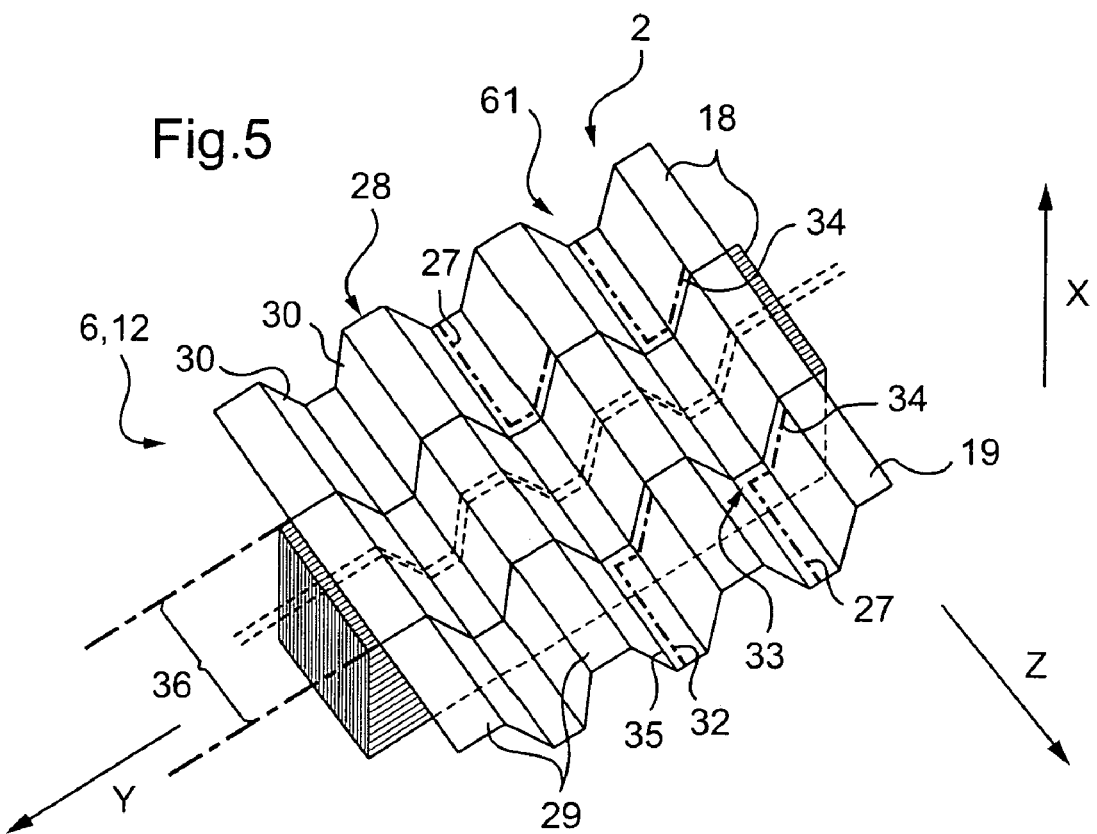

Fig. 11
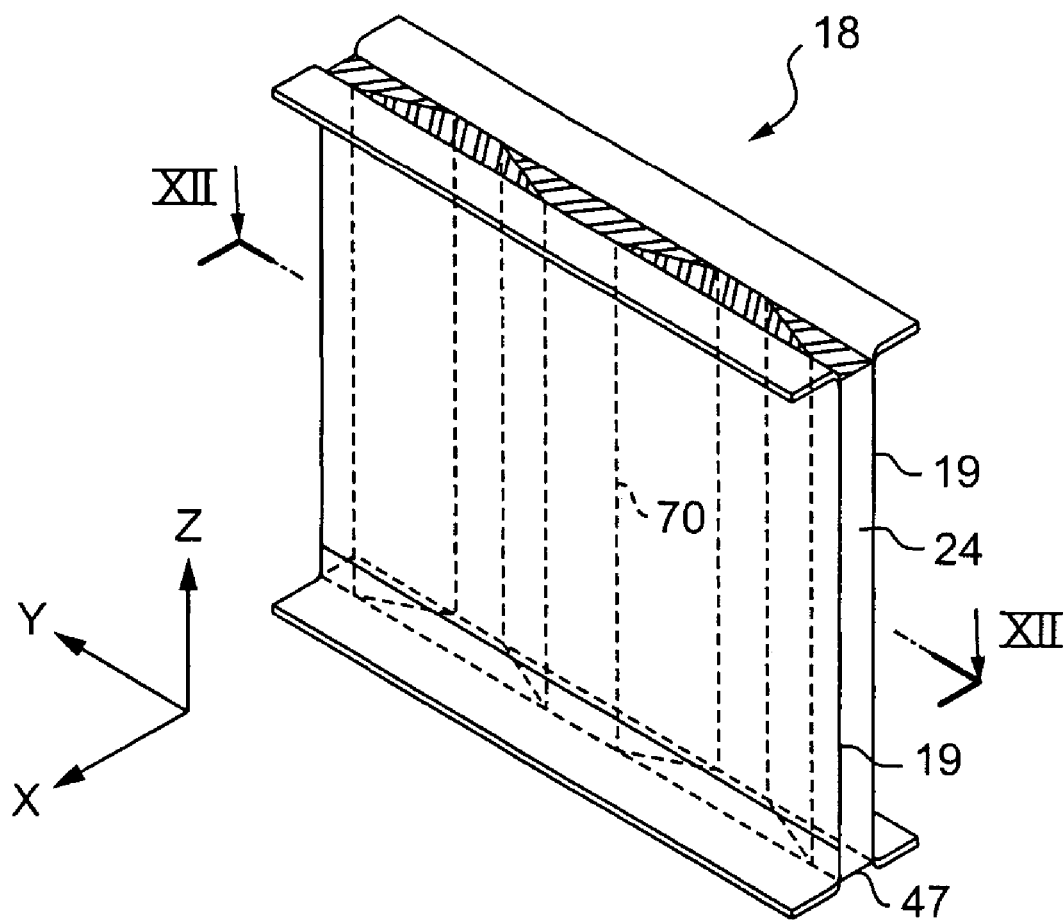
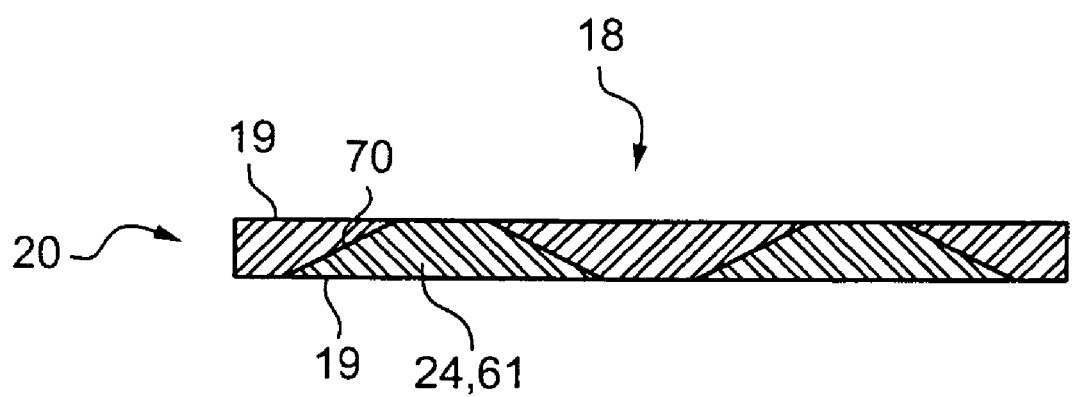
Fig. 12

COMPOSITE ANTI-CRASH STRUCTURE WITH CONTROLLED BUCKLING FOR AN AIRCRAFT

The invention relates to a composite anti-crash structure for an aircraft, and also to an aircraft including such a structure.

The invention applies in particular to rotorcraft, and specifically to helicopters.

BACKGROUND OF THE INVENTION

The structure of such aircraft needs to be compatible with standardized functional constraints, and also with certification, in particular.

In the event of the aircraft impacting against the ground (crashing), structural damage must be limited and even prevented, in particular in the vicinity of the cabin and the vital components of the aircraft. All unacceptable injury to humans must be avoided.

At present, complying with certain specifications is in contradiction with obtaining functions that are desired for such and such a component of the aircraft, thus requiring compromises to be made that are not always acceptable in practice. This applies in particular to rotary wing aircraft.

The search for increasing the capacity of the structure of an aircraft to absorb energy due to an impact (accident) has lead to numerous proposals.

Patent FR-2 632 604 describes a helicopter structure comprising a frame essentially constituted by a gantry whose ends are interconnected together by a cross-member. The cross-member is constituted mainly by a panel presenting a sandwich structure and constituted by two thin vertical cores defining a space that is filled with a deformable material (honeycomb or foam) to which they adhere. The cores of the panel present horizontal corrugations in their bottom portion. A particular structure makes it possible to obtain controlled deformation of the cross-member by initiating buckling in the event of an impact.

U.S. Pat. Nos. 4,084,029, 4,734,146, and FR-2 817 608 relate to beams having a composite corrugated core of sinusoidal shape. In FR-2 817 608, the beam is designed to absorb, in controlled manner, an intense and sudden compression force applied in its vertical direction under the effect of the kinetic energy released by a violent impact such as an aircraft crash. The core comprises a plurality of sheets of carbon fibers and of aramid fabric that are stacked together. Cuts formed in an edge adjacent to the soleplate of each fiber sheet serve to initiate rupture, so as to load and degrade the sheets progressively during application of a compression force suitable for causing the beam to rupture.

The present invention applies in particular to rotorcraft of a structure made up of frames of the kind described in FR-2 632 604, and also to beams interconnecting the frames in pairs.

Various other structures for absorbing energy in the event of an aircraft fuselage impacting the ground have also been proposed.

U.S. Pat. No. 6,620,484 describes an absorption structure comprising vertical composite panels having a thread stitched therein at a density that increases from the bottom of the structure towards its top portion.

U.S. Pat. No. 4,593,870 relates to an impact absorber that extends under the floor of a helicopter cabin and that comprises a crossed array of beams including a laminate or two laminates covering a honeycomb-structure core. Rupture-initiators are provided in the bottom of the laminate.

U.S. Pat. No. 4,941,767 describes intersecting planes with connections via ring-section parts. Patent FR-2 763 313 describes an installation for suspending a tank.

U.S. Pat. No. 5,069,318 describes reinforcement surrounding a thin wall in order to stabilize its behavior in the event of a crash. U.S. Pat. No. 5,451,015 describes an installation for protecting a tank in the event of a crash. U.S. Pat. No. 6,718,713 describes a preshaped member having an insertion channel for a plane partition. Document WO 03/018295 describes a member that is preformed to the shape of the Greek letter "Pi", for assembling composite parts together.

In spite of that research, there remains a need for an improved aircraft structure for taking up forces and absorbing the energy that results from an impact.

In particular, it is appropriate when making such a structure safe in the event of a crash for the necessary adaptations to avoid major modification to the surroundings of the force take-up structure (whether pre-existing or being designed). The additional on-board weight and bulk should be small or negligible and the dynamic effects generated (buckling, movement of on-board equipment) should not be penalizing during normal operation of the aircraft. It is also desirable for installation and maintenance costs to be low, and for the means implemented to be simple, robust, and long-lasting.

These criteria are particularly draconian for rotary wing aircraft where questions of on-board weight and bulk are particularly constraining.

In particular, it is desirable to obtain an aircraft structure that is compatible with an impact speed of about 7 meters per second (m/s) to 9 m/s, e.g. about 8.2 m/s. It is also desirable for the maximum impact forces on the aircraft structure (e.g. the cabin floor) at the end of a crash to be compatible with the strength of the surrounding structure so as to avoid damaging it.

Up to some acceptable value, e.g. up to a value of the order of 25,000 newtons (N), the impact forces of a crash should not be transmitted to the take-up structure and their energy should be absorbed.

OBJECTS AND SUMMARY OF THE INVENTION

An object of the invention is to mitigate the problems while complying with as large a number as possible of the criteria mentioned above.

To this end, in an aspect of the invention, there is provided an aircraft structure comprising transverse walls connected to longitudinal walls. Each wall comprises two jackets of composite material disposed on either side of an intermediate arrangement. At least one of the walls has a corrugated core presenting corrugations extending along an axis (Z) that is substantially parallel to the jacket, such that the capacity of the wall to absorb energy in the event of an impact along said axis is increased, and at least one of the walls includes a zone of weakness encouraging controlled degradation of the wall during such an impact.

In preferred embodiments of the invention:

the structure may comprise a floor, transverse walls in the form of frames, and longitudinal walls in the form of beams having cores that extend along substantially vertical axes (Z), and said longitudinal walls, said corrugated core, and said zone of weakness extending beneath the floor;

a portion of the intermediate arrangement may comprise the corrugated core extending in waves that come flush with, or extend to the locations of, corresponding outer jackets;

the corrugated core may be of periodic shape, and in particular it may be sinusoidal or trapezoidal in shape. Under such circumstances in particular, the core co-operates with the jackets to define cavities in the form of portions of prisms of polygonal section and of substantially vertical axis (Z);

each of the two jackets of a wall may include at least one zone of weakness in order to encourage symmetrical deformation of the corresponding wall in the event of an impact;

the intermediate arrangement may contain a cellular material such as a synthetic foam or a honeycomb structure;

at least one of the jackets may include one (or more) stiffeners extending in a reinforcement zone that is substantially parallel to the axis (Z) of the corrugations in the core; these zones may be regularly spaced apart and formed in each jacket of a wall; these reinforcements are designed (and suitable) for reinforcing the lateral bending stiffness of the wall in order to prevent the wall deflecting laterally in the event of a crash, where such deflection runs the risk of disturbing the vertical flattening of the wall and thus the energy-absorption process;

a zone of weakness may be in the form of a localized interruption in at least one layer (A) of at least one outer jacket, said localized interruption zone forming a portion of the plastically-deformable anti-crash means and being suitable for initiating rupture and then for being subjected to energy absorption by localized buckling;

at least one wall may include an outer jacket and a corrugated core comprising a plurality of layers of fibers or fabrics made of carbon, of aramid, or obtained from polyparaphenylene terephthalamide, the fibers or fabrics being impregnated with epoxy resin or the equivalent;

at least one load-carrier wall has a sinusoidal profile in a longitudinal and transverse plane (X,Y) and may possess layers or plies with cuts formed by successive flare segments that are initially in elevation perpendicularly from opposite edges of the wall and then angled through an angle of about 90°, and substantially transverse advance segments extending to the proximity of a central strip, the odd-numbered layers or plies having cuts with advance segments extending in a first direction from the angled segment, while the even-numbered layers or plies have cuts with advance segments extending in a direction opposite to the first direction of the odd-numbered layers;

at least one load-carrier wall may possesses layers or plies with cuts that are inclined at an angle (I, J) of about 45° in a longitudinal and transverse plane (X,Y), these cuts being inclined in a first direction for the odd-numbered layers and in the opposite direction for the even-numbered layers, folds forming central rectangular flaps of longitudinal main axis extending transversely on either side of quadrilateral flaps, a longitudinal fold edge being remote from the central flap, and two intersecting edges being contiguous at a corner of said rectangular flap, and extending at substantially 45° relative to the transverse axis (Y);

on load-carrier walls in the form of frames, an outer layer of the jacket known as the "first" ply may be cut. On load-carrier walls in the form of beams, an outer layer of the outer jacket known as the "first" ply may extend as far as the heel or base of the beam; and the corrugated core may include flattened portions of outer skin sectors at the tops and bottoms of the corrugations in order to provide plane assembly surfaces.

Thus, according to an aspect of the invention, an aircraft structure is proposed that includes plastically-deformable anti-crash means that are arranged, in the event of a crash, to enable energy to be absorbed in controlled manner within the load-carrier wall by localized buckling over at least one skin sector that coincides locally with an outer jacket, and/or by continuous degradation of at least a portion of the intermediate arrangement.

Another object of the invention, is to provide a rotary wing aircraft possessing at least one composite anti-crash structure in accordance with the invention.

The invention makes it possible to integrate energy-absorption means in a force take-up structure that is made essentially of composite material, which energy-absorption means are capable of providing a remarkable amount of energy absorption during a crash, and to do so without degrading the static strength of the structure.

BRIEF DESCRIPTION OF THE DRAWINGS

Other aspects, characteristics, and advantages of the invention appear from the following description which refers to the accompanying drawings that show preferred embodiments of the invention, without any limiting character.

In the drawings:

FIG. 1 is a diagrammatic longitudinal elevation view of a helicopter in accordance with the invention, shown from the side with its front end or "nose", to the left and its rear end or "tail" to the right;

FIG. 2 is an "exploded" perspective view (seen from the side and above) showing a helicopter structure of the invention with its component parts shown prior to assembly;.

FIG. 4 is a fragmentary section on IV-IV of the FIG. 3 structure, showing the position of a delamination insert of the bar of cross-shaped section;

FIG. 5 is a fragmentary perspective view of a frame of a structure in accordance with the invention, with a thick chain line showing an example of where to cut a ply of odd number (in the laying order within the structure);

FIG. 6 is a view of a component of the structure similar to that shown in FIG. 5, in which a thick chain line shows an example of cutting a ply of even number (in the laying order within the structure);

FIG. 11 is a view similar to FIG. 10 showing a beam with a core comprising a corrugated composite wall and filler foam; and FIG. 12 is a section view on XII-XII of FIG. 11 showing the arrangement of outer coverings and a corrugated core with sectors of skin flush with the outer coverings.

MORE DETAILED DESCRIPTION

Figure 3:
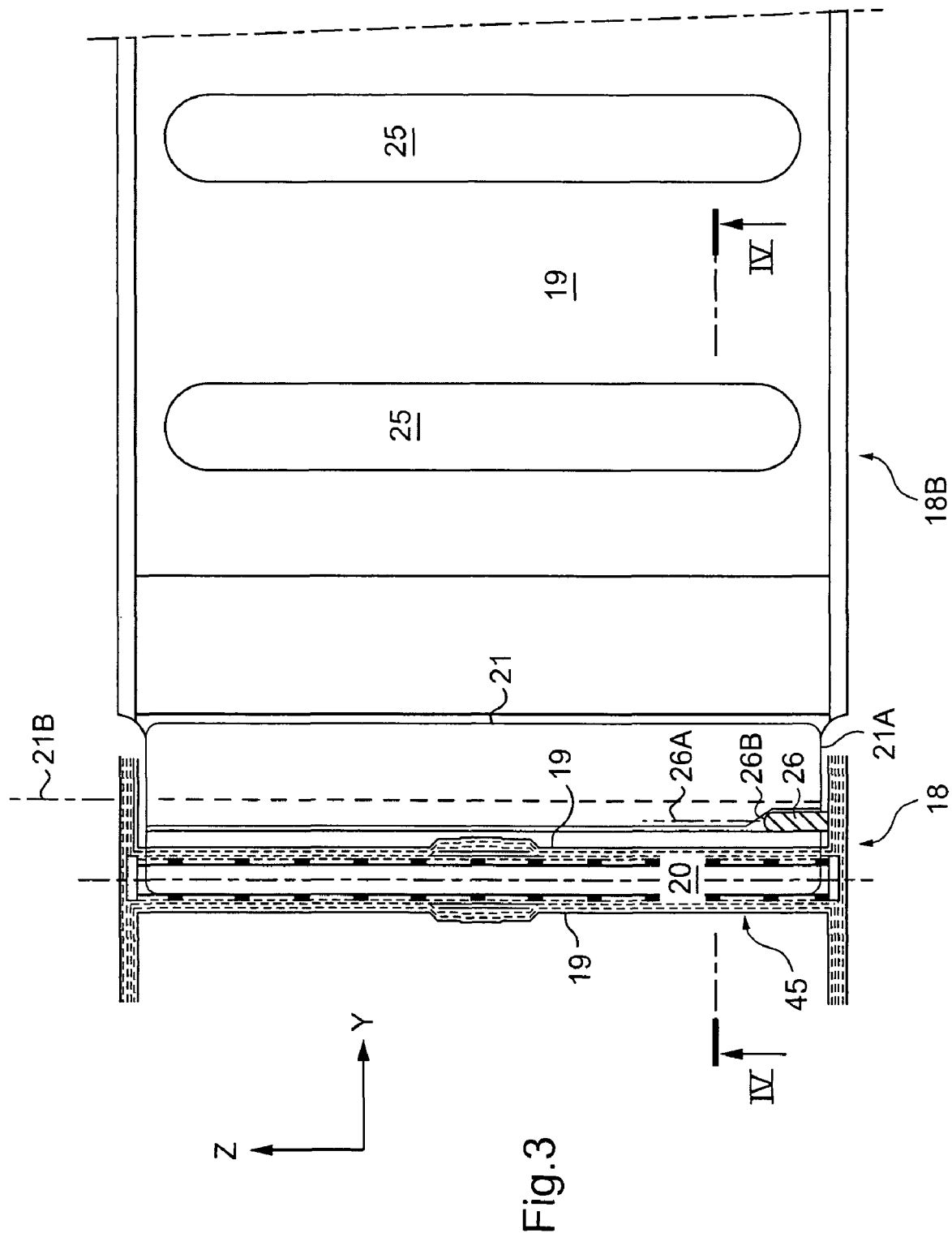
FIG. 3 is a cross-section view of a first wall of a structure of the invention, the figure also showing a second wall of the structure that is connected to the first wall via a bar (or section member) of cross-shaped section having four branches (cross-strut)

In the drawings, where elements that are identical or similar are given the same reference numerals, there can be seen three mutually orthogonal axes.

A vertical or so-called elevation axis Z corresponds to the height and the thickness of the structures described: terms such as up/down or top/bottom are used relative thereto.

A horizontal or "longitudinal" axis X corresponds to the long or main dimension of the structures described. Terms such as front/rear are used relative thereto.

A horizontal or "transverse" axis Y corresponds to the width or lateral dimension of the structures described. The term "side" is used relative thereto.

The axes X and Y define a horizontal X,Y plane. The axes X and Z define a longitudinal (and vertical) X,Z plane. The axes Y and Z define a transverse (and vertical) plane Y,Z.

In FIGS. 1 and 2, the aircraft 1 is a helicopter comprising a fuselage 2B, a main rotor 15, and an anti-torque rotor 16. The invention can be implemented in other types of aircraft, both fixed-wing aircraft and lighter-than-air craft, for example.

In FIG. 1 or 2, there can be seen a force take-up structure 2. Such a structure 2 provides the fuselage 2B of the aircraft 1 with the stiffness it requires for its operation, both in terms of safety behavior and in the event of a crash.

As can be seen in FIG. 2 in particular, this force take-up structure 2 comprises load-carrier walls in the form: i) of transverse frames 3 to 8 identified from the rear end (to the left) to the front end (to the right); ii) longitudinal beams 9 to 12; iii) a floor 13; iv) a machine floor 14 suitable for supporting a main transmission gearbox coupled to the main drive and lift rotor 15 and also to a rear rotor 16; and v) walls in the form of partitions, such as those referenced 17 and 17B which serve to cover the structure 2 and form side and bottom portions of the fuselage 2B.

The force take-up structure 2 is of the composite (laminated) type. With reference to FIGS. 3 to 4 and 10 to 12, in particular, each load carrier wall 18 of the structure 2 comprises two generally plane outer jackets 19 disposed on either side of an intermediate arrangement 20, 23, 24, 70.

In FIGS. 3 and 4, the structure 2 has two walls 18 and 18B, each comprising an assembly of a jacket 19 and an arrangement 20. The skins or jackets 19 are made from a resin-impregnated fiber fabric. The composite material parts may be shaped by hot-molding, e.g. with a molding temperature of about 180° C. The arrangement 20 is constituted by a honeycomb to which the jackets 19 are adhesively bonded.

Each jacket 19 may comprise a plurality of stacked layers, for example:

an outer layer in the form of a composite fabric ply of impregnated carbon fibers extending substantially at an angle of about 45° relative to the main energy-absorption axis Z;

a middle layer in the form of a composite fabric ply of impregnated aramid fibers extending substantially at an angle of about 45° relative to the axis Z; and an intermediate layer in the form of a composite fabric ply of impregnated carbon fibers extending substantially at an angle of about 0° or 90° relative to the axis Z.

Other layers may be provided in which the fibers extend at a zero angle (0°) relative to the axis Z. In such a stack, a distinction can be drawn between odd-numbered layers including the outer layer of the outer jacket 19, referred to as the "first" ply, and even-numbered layers that may possibly include an inner layer referred to as the "last" ply.

Some of the layers of the wall may include fibers that are internally arranged in a crossed configuration, i.e. in sublayers of fibers extending in directions that intersect at a predetermined angle (e.g. 90°), from one sublayer to another. These sublayers may be resin impregnated together within a common substrate.

In other layers, the fibers are disposed in sheets of uniform orientation, i.e. of substantially parallel orientation.

The walls 18 and 18B shown in FIGS. 3 and 4 are assembled together by means of an interconnection cross-strut 21 and they are filled with a cellular material of honeycomb type (23) forming the arrangement 20.

The wall 18B has reinforcing shapes 25, referred to as "outside" shapes, serving to stabilize said wall laterally and thus improve its ability to absorb energy while being flattened vertically, which shapes are formed within the two jackets 19.

A cylindrical insert 26 of axis 26A (parallel to the axis Z) having a frustoconical head 26B is housed at the base 21A of the section member 21 of axis 21B, for the purpose of causing the material of the section member 21 that surrounds it to be degraded by delamination in the event of an impact along the axis Z.

The insert 26 extends substantially along the axis Z in which energy is absorbed in the event of a crash, and under such circumstances, by degrading the section member 21, at least in part, it serves to reduce its strength for withstanding forces along the axis Z so that its strength becomes close to that of the walls 18, 18B, thereby encouraging a balanced contribution from the components of the structure for absorbing the energy of the impact.

In the event of an impact, the insert or nail encourages the section member 21 to tear, burst, or delaminate by "drilling" a "channel" inside at least the base of said section member.

The insert 26 thus makes it possible to create a rupture starter by bursting the assembly or connection portion that surrounds it within the section member 21 that acts as the member interconnecting the walls 18 and 18B.

Such a section member or cross-strut 21 may be obtained, for example, by winding fibers and/or draping fabric around a core.

Under normal circumstances, the cross-strut 21 provides structural continuity between the walls 18 and 18B, and the insert 26 performs no function.

In the event of a crash, the stiffness (along the axis Z) of the cross-strut and of the connection in which it forms a part is harmful to absorbing energy. Because of the presence of the delamination insert, the cross-strut is degraded or destroyed under such conditions, thus making it possible, where appropriate, for the structural elements that it used to interconnect to be separated (in particular a frame or beam), thus allowing said elements to contribute to absorbing the energy of a crash.

In FIG. 5, there can be seen a perspective view of a structure 2 comprising a frame 6 secured to a beam 12.

Cuts 27 in the layers or plies are represented by a thick interrupted line. Within the wall 18 or frame 6, the layers are said to be "odd-numbered" because of the order in which they are laid.

The structure 2 comprises a load-carrier wall 18 or corrugated beam 12 that extends transversely along the axes Y and Z, and forms corrugations or waves 28 parallel to the axis Z.

Since the beam 12 and the frame 6 are assembled together, e.g. during molding, the frame 6 presents shapes that are complementary those of the waves 28.

The corrugated wall 18 has shapes in its outer jacket 19 such that for each wave 28, two skin sectors 29 locally coincide with the jacket planes of the wall 18, which extend along the axes Y and Z.

Between these skin sectors 29, portions 30 of the wall 18 form continuous connections with these two skin sectors 29 and are inclined relative to the jacket planes extending along the axes Y and Z.

The waves 28 have skin sectors 29 that become flush in alternation in one and then in the other of said jacket planes. Thus, the skin sectors 29 and the sloping connection portions 30 together define a series of cavities 61 having the shape of portions of prisms of trapezoidal section.

Odd-numbered plies or layers have cuts 27 with flare segments 32 extending substantially along the axis Z, in a first direction from an angled segment 33. Within a given cut 27 of an odd-numbered ply, there can be seen an advance segment 34 extending substantially along the axis Y.

The flare segments 32 coincide substantially with an edge 35 forming the bottom of a corrugation, between a skin sector 29 and a connection portion 30, substantially parallel to the axis Z, going from a base edge of the wall 18 to a middle zone 36 in elevation (Z). This zone 36 is in register with the high and low edges of the frame 6 along the axis Z.

Each of the advance segments 34 extends over a skin sector 29 initially substantially along the axis Y from the bend segment 33 connecting the segment 34 to the adjacent flare segment 32. Then said advance segment 34 continues to extend substantially along the axis Y in projection onto a jacket plane of the wall 18, but over a connection portion 30, and thus following the inclination of said portion.

In FIG. 6, the layers are said to be "even-numbered" plies, and they have cuts that are fairly similar to those of the odd-numbered plies of FIG. 5.

However, the flare segments 32 extend substantially along bottom edges 35 that are transversely opposite (along the Y axis) from the edges followed by the even-numbered plies.

The advance segments 34 of the even-numbered plies also extend substantially along the transverse axis Y from the contiguous bend segment 33, but in the opposite direction (from right to left in FIG. 6) to the advance segments 34 of the odd-numbered plies.

An advance segment 34 then extends over a connection portion 30 following the inclination thereof, likewise in the direction opposite to the first direction of the odd-numbered layers.

Thus, superposing odd- and even-numbered plies or layers provides optimized qualities to the wall 18 by alternating the locations of the cuts 27 and consequently of fibers within the impregnation resin.

By means of such cuts 27, the method of fabricating load-carrier walls 18 can present other features associated with the way in which the layers are folded. This can be seen from the examples of FIGS. 7 to 9.

In a variant, the wall 18 may present a profile that is curved (sinusoidal).

Figure 7:
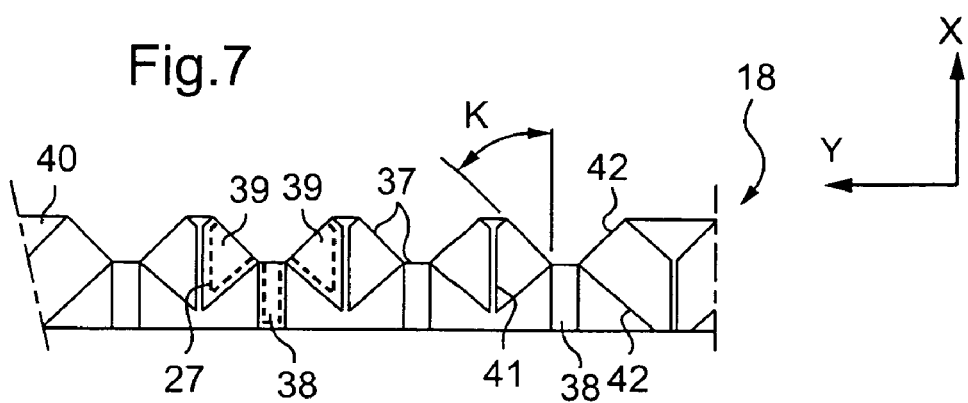
FIG. 7 is a fragmentary transverse longitudinal view of a ply of composite fabric for a component in accordance with the invention similar to that shown in FIG. 5, with the thick dashed line showing an example of how composite fabric plies are folded and cut within the structure.

FIG. 7 shows an example of cuts 27 in the composite fabric ply within a wall 18 of the structure 2, which cuts are represented by a thick and interrupted line pair.

Layers with cuts 27 by means of folds 37 in the odd-numbered plies form successive central strip flaps 38 substantially along the longitudinal axis X, and thus perpendicularly from opposite edges of the wall 18.

Furthermore, the layers or plies having cuts 27 form folds 37 providing angled flaps 39 folded through an angle K of about 45° relative to the axes X and Y. The angled flap 39 extends in register with a top edge 40 (substantially parallel to the axis Y) of the wall 18, and as far as the proximity of a central strip flap 38.

In other words, these folds 37 form central rectangular flaps 38 of main axis X that extend transversely on either side from quadrilaterals. These quadrilaterals define the angled flaps 39.

A longitudinal edge 41 of the fold 37 is remote from the flap 38 forming a central rectangle, and two intersecting edges 42 are contiguous with a corner of the rectangle, extending substantially at 45° relative to the axis Y, but opposite from the angle K about which the corresponding flap 39 is folded.

Figures 8, 9:
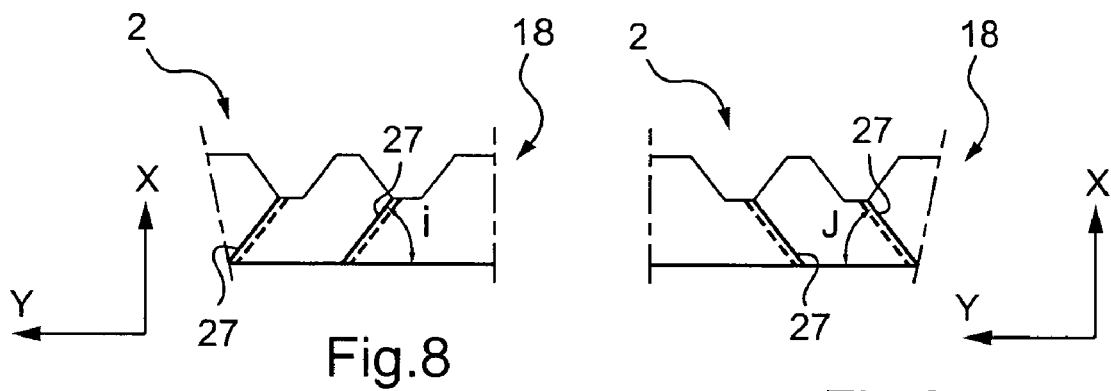
FIG. 8 is a fragmentary transverse longitudinal detail view seen in the elevation direction opposite to that shown in FIG. 5, showing an odd-numbered sheet of a ply of a wall of a structure in accordance with the invention, in which the continuous and interrupted line pair shows an example of how a composite fabric ply within the structure is folded and cut.
FIG. 9 is a view similar to FIG. 8, but of an even-numbered sheet of the invention, in which the continuous and interrupted line pair shows an example of folding within the structure.

FIG. 8 shows a wall 18 of the example of FIG. 5 seen substantially along the axis Z with cuts represented by continuous and discontinuous line pair.

Folds are also made herein, but they are not visible. The load-carrier wall 18 possesses layers or folds with cut 27 inclined at an angle I of about 45° in a plane X,Y.

These cuts 27 slope in one direction for odd-numbered layers and in the opposite direction for even-numbered layers, as shown clearly by the angle J of the cuts 27 of FIG. 9, which angle is opposite to the angle I.

In embodiments, on load-carrier walls 18 in the form of frames (4 to 8), an outer layer of the outer jacket 19 is said to be the "first" ply and is cut. Alternatively, or in addition, on walls 18 in the form of beams (9 to 12), an outer layer of the jacket 19 of the "first" ply extends to the heel of the base of said wall 18.

In FIGS. 5 and 6, it can be seen that the corrugated walls 18 have skin sectors 29 that are flattened at least in part at the tops and bottoms of the corrugations, thus making it easier to assemble the wall with other elements of the structure 2.

The two walls 18 and 18B (FIGS. 3 and 4) are assembled together while fabricating the component of the structure 2 that includes these walls, in a molding operation. This fabrication may comprise the following main steps.

The wall 18B extends along a first plane (Y,Z), while the wall 18 extends along a second plane (X,Z) perpendicular to the first plane; each wall has lateral stiffening shapes 25 and a honeycomb filler 20, 23.

To assemble these walls together, a multiple-shell mold is used that defines an internal cavity.

One shell is covered in layers or sheets of fibers, that may be pre-impregnated, where appropriate. The honeycomb fillers and the interconnection cross-strut 21 fitted with the delaminating insert 26 are then placed in the mold, one of the blades 21C of the section member 21 being engaged in a slot provided in the filler 23 of the wall 18. The cross-strut 21 provides additional rigidity to the structure 2 that is to be fabricated.

Additional layers are stacked and the impregnation resin is added to and/or integrated in the layers.

After an outer series of layers has been stacked, a backing shell possibly including an inflatable confinement element is placed on top of the set of layers and components placed in the mold.

Hot compression (e.g. at 1500 kilograms per square millimeter ($kg/mm^2$) and 180° C.) is then applied. Subsequent opening of the mold by moving the shell and the backing shell apart enables the structure 2 to be released, in which structure the two walls 18 and 18B are connected together by the section member 21.

Such integration reduces any risk of error in positioning and/or assembly when the components of the structure 2 are brought together (e.g. components 4 to 14, 17 and 18).

The load-carrier walls 18 of the structure 2 possess plastically deformable anti-crash means, in particular in the form of shapes 25, 45 that contribute to controlled energy absorption by localized buckling.

These deformable anti-crash means may be designed for the aircraft 1 suffering an impact at a speed of about 8 m/s. Under such circumstances, the maximum impact forces on the structure 2 at the end of a crash are caused, by the action of the anti-crash means, to contribute to the strength of the structure 2 so that it does not become damaged in unacceptable manner. Until the crash impact forces exceed an acceptable value, they are not transmitted to the portion of the structure 2 that extends above the beams, and the energy thereof is absorbed by the anti-crash means in particular.

In order to initiate rupture of the wall 18 in the event of a crash, the wall 18 includes zones of weakness 45 that extend in a direction that intersects (in particular orthogonally) a main direction of the forces to be absorbed in the event of a crash, which main direction often substantially coincides with the elevation axis Z.

In FIG. 3, shapes or zones of weakness 45 are in the form of edges of the composite layers within the jacket 19 of the wall 18.

These edge zones 45 generally extend along the axis X, defining projecting stripes that are stacked on one another, such that at the location of each of these shapes 45, the jacket 19 presents thickness that is reduced.

Figure 10:
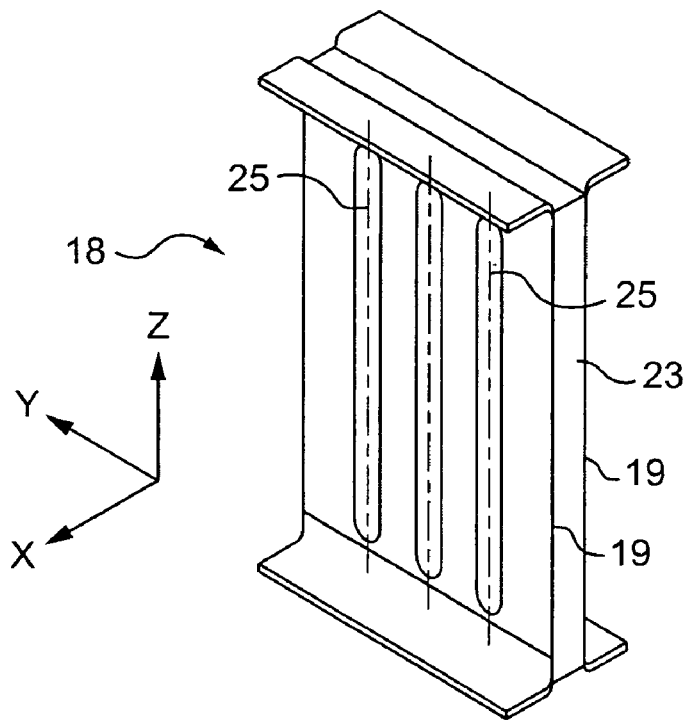
FIG. 10 is a fragmentary perspective view (a transverse longitudinal view seen from above in elevation) of a honeycomb composite cross-member forming part of a structure in accordance with the invention, with buckling being controlled by concave regions extending in elevation and obtained, for example, by confined compression (possibly while hot) of an outer covering of impregnated fibers during molding.

Other shapes 25 define local stiffnesses in the form of indentations in one or both skin composite layers of the jacket 19 of the wall 18, 18B (FIGS. 3, 4, and 10).

These concave indentations generally extend along the elevation axis Z and define parallel oblong grooves that are regularly spaced apart along the transverse axis Y.

At the locations of these shapes 25, the wall 18 presents reduced thickness. The propagation of buckling in the wall 18 is guided along the axis Z by means of this array of grooves.

These shapes 25 may be obtained hot while the wall 18 is being molded, or else by deforming the jackets 19 by applying pressure to them by using dies in translation and/or in rolling.

As shown in FIG. 12, the arrangement 20 of the wall 18 comprises a core 70 of section in a plane perpendicular to the jackets 19 that is corrugated, thereby contributing to the deformable anti-crash means.

The core 70 in the form of crenellations extends generally along the elevation axis (Z), at least from the vicinity of a base 47 of the load-carrier wall 18 and between the jackets 19.

The intermediate portion of the arrangement 20 with the corrugated core 70 has skin sectors that locally coincide with the corresponding jacket 19, and a synthetic foam 24 of the intermediate arrangement 20 extends between these skin sectors, in continuity therewith.

This wall can be deformed by localized buckling of the skin sectors 29, and also by degrading the foam of the arrangement 20.

The core 70 may be flush with the jackets 19 of the wall 18.

The core 70 of the arrangement 20 co-operates with the skin sectors to define cavities 61 that are filled with foam 24 and that have the shape of prism portions of trapezoidal section.

The core 70 and the filler material 24 form portions of the deformable anti-crash means and they absorb energy in the event of an impact.

What is claimed is:

1. A fuselage structure (2) of a rotary wing aircraft, comprising:
    vertical walls, comprised of transverse walls (18B) and longitudinal walls (18);
    a cross-strut section member (21) joining the longitudinal walls (18) to the transverse walls (18a); and
    a cylindrical delaminating insert (26), having a frustoconical head, located at a base (21A) of the section member (21),
    wherein each of the vertical walls comprises an intermediate arrangement (20) and two planar jackets (19) of composite material disposed on either side of the intermediate arrangement (20),
    wherein the intermediate arrangement of at least one of the vertical walls comprises a corrugated core (70) presenting corrugations extending along an axis (Z) substantially parallel to the planar jackets such that an energy-absorption capacity of the at least one of the vertical walls in an impact in a direction of the axis (Z) is increased,
    wherein a base of the at least one of the vertical walls includes a zone of weakness (45) where a thickness of the at least one vertical wall is reduced,
    wherein the corrugated core cooperates with the planar jackets to define cavities (61) shaped as portions of prisms of polygonal section with a cellular filler material (23, 24) filling the cavities, and
    wherein the delaminating insert (26) has a central axis extending parallel to the axis (Z), the delaminating insert (26) being configured to cooperate with a material of the section member surrounding the delaminating insert (26) to delaminate the material upon the occurrence of the impact.

2. The structure (2) according to claim 1, further comprising:
    a floor (13),
    wherein the transverse walls (3-8) are in the form of frames, and the longitudinal walls (9-12) are in the form of beams having cores extending along the axis (Z),
    wherein the axis (Z) is substantially vertical, and
    wherein said longitudinal walls, said corrugated core, and said zone of weakness extend under the floor.

3. The structure (2) according to claim 1, wherein the corrugated core of the intermediate arrangement portion (20) extends in waves, the waves coming flush with, or extending to locations of, the planar jackets (19).

4. The structure (2) according to claim 1, wherein each of the two planar jackets includes at least one zone of weakness (45) configured to encourage symmetrical deformation of a corresponding wall in the event of an impact.

5. The structure (2) according to claim 1, wherein the cellular filler material (23, 24) is a synthetic foam.

6. The structure (2) according to claim 1, wherein the zone of weakness (45) extends over a perpendicular zone being substantially perpendicular to the axis (Z) of the corrugations of the core (70).

7. The structure (2) according to claim 1, wherein the at least one of the vertical walls includes a stiffener (25) in the form of a concave depression extending within at least one of the planar jackets (19).

8. The structure (2) according to claim 1, wherein the zone of weakness (45) is a localized interruption in a layer of at least one of the planar jackets (19), the localized interruption forming part of a plastically-deformable anti-crash means and configured to initiate a rupture and further configured to suffer energy absorption by localized buckling.

9. The structure (2) according to claim 1, wherein the at least one of the vertical walls has a plurality of concave reinforcing depressions (25) extending along said axis (Z), the depressions being regularly spaced apart and formed in each of the planar jackets (19), the depressions configured to strengthen a lateral bending stiffness of the at least one vertical wall such that the at least one vertical wall is prevented from bending laterally in the event of the impact.

10. The structure (2) according to claim 1, wherein the corrugated core includes flattened portions of outer skin sectors (29) at a top and a bottom of the corrugations to provide a planar assembly surface.

11. The structure (2) according to claim 1,
wherein an outer layer of the planar jackets (19) on the transverse walls (3-8) are cut, and
wherein an outer layer of the planar jackets (19) on the longitudinal walls (9-12) is extended as far as a heel (47) of the longitudinal walls (18).

12. The structure (2) according to claim 1,
wherein the vertical walls (3-12, 18, 18B) have i) layers with cuts formed by successive flare segments (31) extending initially substantially in elevation perpendicularly from opposite edges of the wall (18) and then angled (33) at an angle of about 90°, and ii) advance segments (34) extending substantially transversely to the proximity of a central strip (38),
odd-numbered layers having the cuts with the advance segments (34) extending in a first direction from the angled segment (33), and even-numbered layers have the cuts with the advance segments (34) extending in a second direction opposite to the first direction.

13. The structure (2) according to claim 1, wherein the vertical walls (4-12, 18, 18B) include
i) layers with cuts that are inclined at an angle (I, J) of about 45° in a longitudinal and transverse plane (X, Y),
the cuts being inclined in a first direction for odd-numbered layers and in a second direction opposite the first direction for even-numbered layers, folds (37) forming central rectangular flaps (38) of a longitudinal main axis extending transversely on either side of quadrilateral flaps (39),
ii) a longitudinal fold edge (37) being remote from the central flaps (38), and
iii) two intersecting edges (42) coinciding with a corner of said flaps (38) and extending at substantially 45° relative to a transverse axis (Y).

14. A rotary wing aircraft (1), including the structure (2) according to claim 1.

15. The structure (2) according to claim 1, wherein the planar jackets (19) and the corrugated core (70) of the at least one of the vertical walls comprises a plurality of layers of fibers or fabrics, the fibers or fabrics being impregnated with epoxy resin.

16. The structure (2) according to claim 1, wherein the delaminating insert (26) is configured to burst a surrounding structure of the base (21A) of the section member (21) upon occurrence of the impact.

17. The structure (2) according to claim 1, wherein the delaminating insert (26) is configured to drill a channel inside at least the base (21A) of the section member (21) upon occurrence of the impact.

18. The structure (2) according to claim 1, wherein the cellular filler material (23, 24) is a honeycomb structure.

19. The structure according to claim 15, wherein the fibers or fabrics are one of i) made of carbon, ii) made of aramid, and iii) obtained from polyparaphenylene terephthalamide.

20. A fuselage structure for a rotary wing aircraft, comprising:
vertical shock absorbing walls, comprising a longitudinal wall and a transverse wall; and
a cross-strut section member joining the longitudinal walls to the transverse walls, the section member having a vertical stiffness greater than a vertical stiffness of the shock absorbing walls,
wherein each of the vertical shock absorbing walls is comprised of generally planar outside jackets made of composite materials, and an internal corrugated core between the outside jackets,
wherein surfaces of the corrugated core cooperate with inner surfaces of the outside jackets on sandwiching the corrugated core to form cavities in an interior of the shock absorbing walls,
wherein foaming material fills the internal cavities of the shock absorbing walls,
wherein a base of at least one of the shock absorbing walls are provided with a weakness zone where at least one outside jacket presents a thickness that is reduced,
wherein the section member comprises a cylindrical delaminating nail, having a frustoconical head, inserted into a base of the section member, and
wherein, in the event of an impact, the delaminating nail is configured to initiate a delamination of a material forming the section member and reduce the stiffness of the section member, and the weakness zone is configured to initiate a rupture of the at least one of the shock absorbing walls, such that the shock absorbing walls and the reduced stiffness of the of the section member cooperate to absorb an energy of the impact.

21. The fuselage structure according to claim 20, wherein the delaminating nail, in the event of the impact, reduces a strength of the section member in withstanding a force from the impact directed in a vertical direction, such that said strength becomes equivalent to a strength of the vertical walls in withstanding said force.

22. The fuselage structure according to claim 20, wherein the delaminating nail is configured to drill a channel inside at least the base of the section member upon occurrence of the impact.

* * * * *